(12) United States Patent
Kroener

(10) Patent No.: US 10,144,311 B2
(45) Date of Patent: Dec. 4, 2018

(54) VEHICLE SEAT HAVING A DRIVE FOR BACKREST AND HEAD-RESTRAINT ADJUSTMENT

(71) Applicant: Brose Fahrzeugteile GmbH & Co. Kommanditgesellschaft, Coburg, Coburg (DE)

(72) Inventor: Gregor Kroener, Bischberg (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 41 days.

(21) Appl. No.: 14/917,543

(22) PCT Filed: Aug. 25, 2014

(86) PCT No.: PCT/EP2014/067971
§ 371 (c)(1),
(2) Date: Dec. 12, 2016

(87) PCT Pub. No.: WO2015/032641
PCT Pub. Date: Mar. 12, 2015

(65) Prior Publication Data
US 2017/0088019 A1 Mar. 30, 2017

(30) Foreign Application Priority Data

Sep. 9, 2013 (DE) .................. 10 2013 217 918

(51) Int. Cl.
*B60N 2/22* (2006.01)
*B60N 2/02* (2006.01)
(Continued)

(52) U.S. Cl.
CPC ............. *B60N 2/22* (2013.01); *B60N 2/0232* (2013.01); *B60N 2/829* (2018.02); *B60N 2/835* (2018.02)

(58) Field of Classification Search
CPC ........ B60N 2/22; B60N 2/829; B60N 2/4829; B60N 2/835; B60N 2/0232
See application file for complete search history.

(56) References Cited

U.S. PATENT DOCUMENTS 2,989,341 A 6/1961 Schliephacke
5,918,940 A * 7/1999 Wakamatsu ........... B60N 2/067
297/378.12
(Continued)

FOREIGN PATENT DOCUMENTS

CN 1822967 A 8/2006
CN 101306656 A 11/2008
(Continued)

OTHER PUBLICATIONS

Korean Office action dated Mar. 30, 2017 issued in corresponding KR Application No. 10-2016-7008844, 10 pages, with English translation, 1 page.
(Continued)

*Primary Examiner* — Philip F Gabler
(74) *Attorney, Agent, or Firm* — Lewis Roca Rothgerber Christie LLP

(57) ABSTRACT

A vehicle seat is provided. The vehicle seat comprises at least one backrest which is pivotally mounted relative to a seating surface of the vehicle seat; a backrest adjusting mechanism and a drive for pivoting the backrest; and at least one headrest on the backrest, which by means of a headrest adjusting mechanism is adjustable in its height relative to the backrest at least along a direction of longitudinal extension of the backrest. It is provided that beside the backrest adjusting mechanism the drive is coupled with the headrest adjusting mechanism, in order to simultaneously transmit an adjustment force to the headrest adjusting mechanism when the backrest is pivoted in at least one backrest adjustment direction. In addition, there is proposed a backrest module
(Continued)

with a drive which beside a backrest adjusting mechanism is coupled with a headrest adjusting mechanism.

13 Claims, 1 Drawing Sheet

(51) Int. Cl.
　　*B60N 2/835*　　(2018.01)
　　*B60N 2/829*　　(2018.01)

(56) References Cited

U.S. PATENT DOCUMENTS

| | | | |
|---|---|---|---|
| 6,726,283 B2 | 4/2004 | Schambre et al. | |
| 7,210,734 B1* | 5/2007 | Yetukuri | B60N 2/06 297/378.12 |
| 2007/0145803 A1* | 6/2007 | Kopetzky | A47C 7/38 297/410 |
| 2008/0284226 A1 | 11/2008 | Brunner et al. | |
| 2011/0101738 A1* | 5/2011 | Jensen | B60N 2/20 297/61 |
| 2011/0133535 A1 | 6/2011 | Jeong et al. | |
| 2012/0056451 A1 | 3/2012 | Tscherbner | |
| 2013/0001394 A1 | 1/2013 | Calvert | |

FOREIGN PATENT DOCUMENTS

| | | |
|---|---|---|
| CN | 201816484 U | 5/2011 |
| CN | 102848947 B | 12/2015 |
| DE | 33 06 188 C2 | 8/1984 |
| DE | 35 12 648 C1 | 10/1986 |
| DE | 196 49 536 C2 | 9/2000 |
| DE | 100 08 524 A1 | 8/2001 |
| DE | 100 27 585 A1 | 12/2001 |
| DE | 197 27 097 C2 | 12/2002 |
| DE | 20 2004 021 396 U1 | 12/2007 |
| DE | 10 2010 040 225 B4 | 5/2013 |
| JP | 2001137067 A | 5/2001 |
| JP | 2004-313456 A | 11/2004 |
| KR | 10-0827364 | 4/2008 |
| KR | 10-2011-0062445 | 6/2011 |
| WO | WO 94/01302 | 1/1994 |

OTHER PUBLICATIONS

China Office Action dated Jan. 26, 2017 issued in corresponding Chinese Patent Application No. 201480059061.3 with Search report (9 pages) and English translation (8 pages).

* cited by examiner

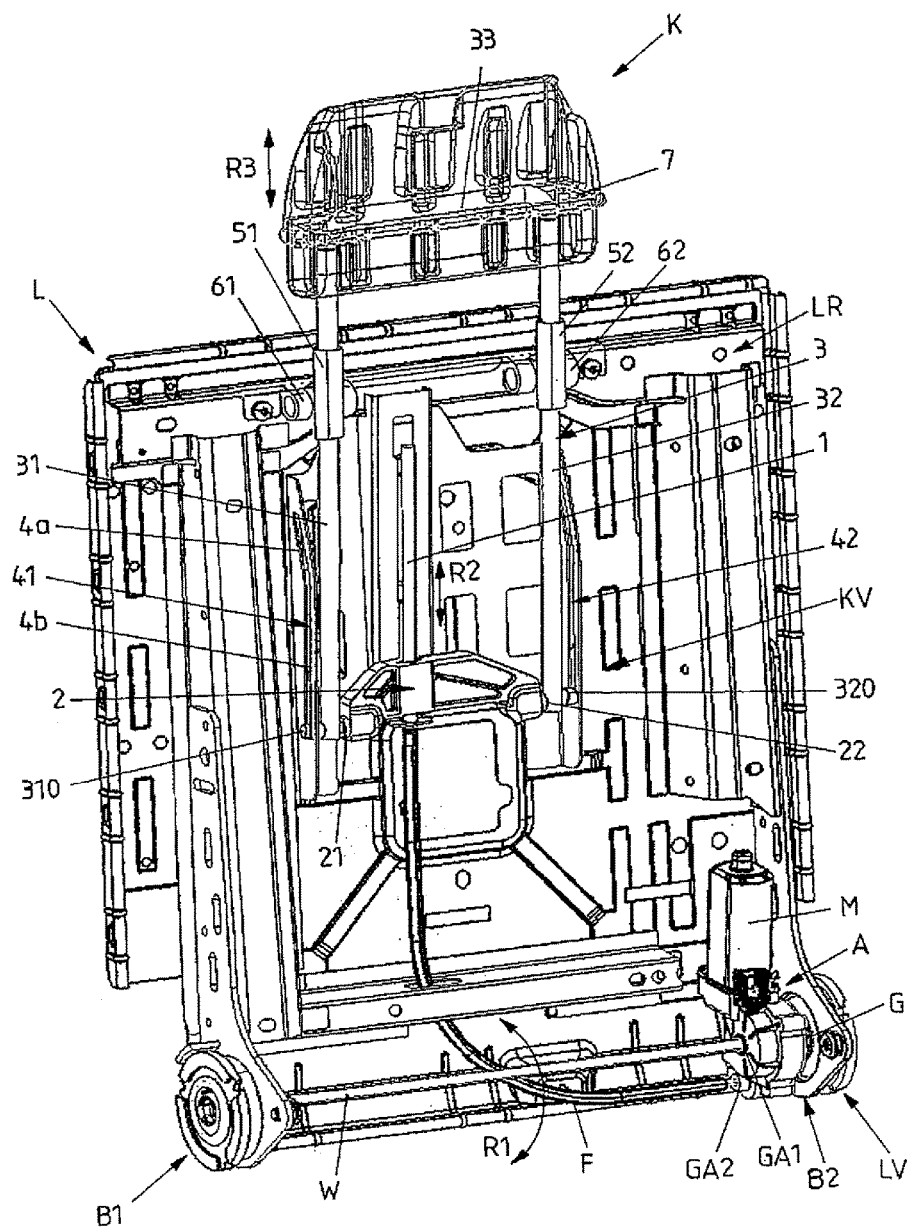

VEHICLE SEAT HAVING A DRIVE FOR BACKREST AND HEAD-RESTRAINT ADJUSTMENT

CROSS-REFERENCE TO A RELATED APPLICATION

This application is a National Phase Patent Application of International Patent Application Number PCT/EP2014/067971, filed on Aug. 25, 2014, which claims priority of German Patent Application Number 10 2013 217 918.9, filed on Sep. 9, 2013.

BACKGROUND

The present invention relates to a vehicle seat and to a backrest module.

A generic vehicle seat includes at least one backrest which is pivotally mounted relative to a seating surface of the vehicle seat. Such vehicle seat for example can be a rear bench or a rear seat for a rear seat row of a vehicle, which can be folded forwards onto the seating surface, in order to achieve an increase of the available loading space. To increase the operating comfort for a user, a backrest adjusting mechanism regularly is provided, which pivots the backrest via a manually actuatable or motorized drive. Without manual intervention of a user, the backrest thus can be pivoted onto the seating surface into a position folded forwards and also can be pivoted back again.

Usually, a headrest is provided on the backrest of a vehicle seat. To be able to adapt the position of this headrest to the body height of a vehicle occupant, the headrest is adjustable in its height relative to the backrest by means of a headrest adjusting mechanism at least along a direction of longitudinal extension of the backrest. The height of the headrest with respect to the seating surface is adjustable manually and/or power-operated.

In particular when pivoting a backrest onto the seating surface of the vehicle seat into a position folded forwards it regularly is desirable that the headrest is lowered maximally, so that the backrest folded forwards together with the headrest requires as little space as possible and the headrest does not collide with a component within the vehicle interior when its folded forwards. For example, by lowering the headrest the risk is minimized that when folding the backrest forwards a headrest of a rear vehicle seat collides with a rear part of a headrest and/or backrest of a vehicle seat arranged before the same and hence possibly prevents that the backrest is folded forwards.

In addition, when a backrest is adjustable in its inclination relative to the seating surface it can also be desirable that the headrest takes a particular position in any position of adjustment of the backrest, in order to ensure that in a crash case the headrest provides sufficient support for the head of a seat user.

SUMMARY

Under these aspects and against the background of the always present cost pressure in the automotive industry it is an object of the present invention to provide an inexpensive and easily mountable possibility for specifying a position of adjustment dependent on the position of the backrest for an at least height-adjustable headrest on a backrest, which is pivotable by a drive.

This object is solved both with a vehicle seat as described herein and with a backrest module as described herein.

In a vehicle seat according to the invention it is provided that a drive which for pivoting the backrest relative to a seating surface of the vehicle seat is coupled with a backrest adjusting mechanism also is coupled with a headrest adjusting mechanism, in order to simultaneously transmit an adjustment force to the headrest adjusting mechanism when the backrest is pivoted in at least one backrest adjustment direction. A individual drive thus serves both to adjust the backrest and to adjust the headrest, wherein at least during an adjustment of the backrest in a particular backrest adjustment direction an adjustment of the headrest is effected at the same time.

In that an individual preferably electromotive drive is mechanically coupled both with the backrest adjusting mechanism and with the headrest adjusting mechanism, a power-operated adjustment of the headrest simultaneously is effected in a particularly inexpensive way for example when folding the backrest forwards and/or when adjusting the inclination of the backrest.

Preferably, an electromotive drive is provided, which in a space-saving way is accommodated at the vehicle seat, preferably at a backrest frame of the backrest. Via a drive with a drive motor a power-operated adjustment of backrest and headrest thus is possible. In principle, however, the solution according to the invention also can comprise a manually actuatable drive, i.e. a drive into which a manual adjustment force is introduced and transmitted to the backrest adjusting mechanism and the headrest adjusting mechanism.

Furthermore it is preferred that the backrest is pivotable, i.e. foldable forwards, onto the seating surface of the vehicle seat by means of the drive, and the drive is coupled with the headrest adjusting mechanism such that the backrest is maximally lowered (automatically) when the backrest is folded forwards onto the seating surface. In this way, the headrest is automatically retracted as far as possible, when the backrest takes a position folded forwards. The backrest with the headrest thus requires the minimum possible installation space. In addition, possible collisions of an extended headrest when folding the backrest forwards are avoided.

In addition, with the solution according to the invention it is of course also possible to simultaneously perform an adjustment of the headrest when adjusting the inclination of the backrest by means of the drive. It thereby can be ensured automatically that the headrest is present in a region relative to the backrest which is advantageous with regard to a crash case. It can be provided that in any pivoted position of the backrest the headrest takes exactly one particular position. Alternatively, the headrest also can separately be adjustable in its height and/or in its inclination by a vehicle occupant manually or power-operated. Via the mechanical coupling of the drive with the backrest adjusting mechanism on the one hand and with the headrest adjusting mechanism on the other hand it at least is ensured in such a case that in dependence on an inclination of the backrest in a state of use in which the vehicle seat can be occupied by a user the headrest is present in a region which for a typical vehicle occupant ensures a support of the head of the vehicle occupant in a crash case. For example, in dependence on the inclination of the backrest the headrest thereby always can be adjusted such that the headrest is present in a region in which for an average male or female adult a support of the head is ensured in a crash case. What is conceivable here is an automatic adjustment of the headrest for a 50-percentile man or a 5-percentile woman.

In one design variant the headrest adjusting mechanism includes an adjusting element carrying the headrest, for example in the form of a U-shaped adjusting clip, which is shiftably guided along a guide relative to a backrest frame of the backrest. By shifting the adjusting element, a height of the headrest thus can be set.

The guide can be formed as connecting link guide with at least one slotted guide, wherein along the slotted guide a guiding element of the adjusting element is slidingly guided. Via the slotted guide a guideway thus is specified for the adjusting element, which defines the course of the adjusting movement imposed on the headrest via the slotted guide, in particular during pivoting of the backrest.

The guide here can specify a linearly extending guideway, so that by shifting the adjusting element a pure height adjustment of the headrest chiefly is effected. A shifting path for the headrest then for example substantially extends along a direction of longitudinal extension of the backrest.

Alternatively, the guide can specify a guideway with a linearly extending portion and at least one further portion extending obliquely thereto. An adjusting movement of the headrest substantially along a direction of longitudinal extension of the backrest thereby can be superimposed with an adjusting movement transversely thereto, in order to vary an inclination of the backrest, in particular of a headrest cushion provided on the headrest. In such a case, shifting of the adjusting element along the guideway consequently not only results in a height adjustment of the headrest, but at the same time in a tilt adjustment of the headrest (relative to a supporting surface defined by the backrest for the back of a seat user).

To support the tilt adjustment of the headrest in particular during an adjustment via the drive, the adjusting element can be mounted on the backrest frame via at least one rotary joint. Via a rotary joint or also a plurality of rotary joints on the backrest frame, a pivot axis for the adjusting element thus is defined, about which the adjusting element can be pivoted together with the headrest fixed thereon.

To improve the adjustability of the headrest for a seat user, it can be provided that the headrest is adjustably, in particular manually adjustably mounted on the adjusting element itself. Accordingly, the headrest preferably is adjusted in a power-operated way by means of the drive also driving the backrest adjusting mechanism and via the adjusting element, when the inclination of the backrest relative to the seating surface changes, in particular when the backrest is folded forwards onto the seating surface. In such exemplary embodiment the headrest in addition is shiftably arranged on the adjusting element and preferably is adjustable relative to the adjusting element independent of the adjustment via the one drive manually and/or—via a further drive—power-operated and in addition is adjustable in its height and/or inclination.

In design variants regarded as advantageous the headrest adjusting mechanism comprises a spindle drive with a translatorily shiftable drive element for adjusting the headrest. A spindle drive regularly can be formed extremely flat and compact, so that the same requires little installation space within the backrest frame.

Alternatively or in addition, the headrest adjusting mechanism can comprise a flexible drive shaft—for example in the form of a so-called "flex-shaft"—, in order to transmit an adjustment force. Such drive shaft consequently need not extend linearly within the backrest frame, but can be arranged in bent form.

A flexible drive shaft for example can drive a spindle of a spindle drive of the headrest adjusting mechanism, in order to translatorily shift the drive element. In such a case, the flexible drive shaft for example is directly connected to one of several transmission outputs of the drive, which are provided for the headrest adjusting mechanism and the backrest adjusting mechanism.

The drive element furthermore can be coupled directly with the adjusting element carrying the headrest, for example via at least one rotary joint.

Alternatively, a spindle of a spindle drive can be connected directly to a transmission output of the drive, and by means of a transmission element, for example in the form of a coupling rod, an adjustment force can be transmitted from the drive element to the adjusting element, in order to retract or extend the headrest along with an adjustment of the backrest.

In one design variant, the drive is coupled with the headrest adjusting mechanism such that the headrest is adjusted both when pivoting the backrest in direction of the seating surface and away from the seating surface. The headrest adjusting mechanism thus is coupled with the drive such that pivoting of the backrest in both backrest adjustment directions about a pivot axis at the same time also leads to an adjustment of the headrest. It is of course expedient here when the headrest is retracted automatically when it is folded forwards in direction of the seating surface and is extended automatically when the backrest is folded back.

In an alternative design variant it can, however, also be provided that the drive is coupled with the headrest adjusting mechanism such that the headrest is adjusted only when the backrest is pivoted in one of the possible backrest adjustment directions. For this purpose for example a pulling means, preferably a Bowden cable, is coupled with the headrest adjusting mechanism and the pulling means is fixed at the headrest. Via the preferably flexible pulling means the drive than exerts an adjustment force on the adjusting element shiftably guided on or in the backrest frame, on which the headrest is held. The headrest thereby is retracted, when pivoting of the backrest is effected by means of the drive. The drive here can drive for example a winding element, for example in the form of a cable pulley on which the pulling means is wound when the backrest is folded forwards, so that the headrest thereby is retracted.

When the headrest itself additionally is shiftably mounted on the adjusting element corresponding to the design variant explained above, it can be achieved via the attachment of the pulling means to the headrest that the drive transmits an adjustment force to the headrest and the headrest adjusting mechanism. This adjustment force effects that initially the headrest is pulled (downwards) relative to the adjusting element in direction of the backrest and subsequently the adjusting element is pulled (downwards) relative to the backrest frame in direction of a pivot axis of the backrest, about which the backrest is pivotable relative to the seating surface.

In a design variant in which the drive is mechanically coupled with the headrest adjusting mechanism via a pulling means and possibly additionally is directly coupled with the headrest, an automatic retraction of the headrest can be achieved in a particularly simple way, when the backrest is folded forwards via the drive. An extension of the headrest after folding the backrest back easily can be effected manually, when the pulling means is taut exclusively in the maximally lowered position of the headrest.

For coupling the drive with the headrest adjusting mechanism and the backrest adjusting mechanism a transmission means with several transmission outputs preferably is provided, wherein the drive at a first transmission output is coupled with the backrest adjusting mechanism and at a second transmission output is coupled with the headrest adjusting mechanism. Upstream of the transmission means an individual drive motor of the drive is provided, which thus can drive the different adjusting mechanisms at the same time via the transmission means.

In one development it can be provided that the vehicle seat includes a further adjusting mechanism by means of which the seating surface is lowered when the backrest is pivoted onto the seating surface, and the drive likewise is coupled with the further adjusting mechanism for lowering the seating surface. For lowering the seating surface, the further adjusting mechanism can engage a seat pan of the vehicle seat. By lowering the seating surface when the backrest is folded forwards, the vehicle seat can be folded extremely flat and form a flat loading area in a particularly effective way. To also drive the further mechanism for lowering the seating surface beside the backrest adjusting mechanism and the headrest adjusting mechanism via the individual drive, a transmission means of the drive can include three transmission outputs, in order to simultaneously transmit an adjustment force to the individual mechanisms, in particular when the backrest is folded forwards.

As already mentioned above, a vehicle seat according to the invention for example is provided for a rear seat row of a vehicle and/or is formed as seat bench. When it is formed as rear bench, the vehicle seat of course also can include several headrests and head rest adjusting mechanisms, which each are coupled with the one drive for the backrest adjusting mechanism.

In principle, a pinch protection device can be provided, via which it is detectable during an adjustment of the headrest whether an obstacle is pinched between the headrest and an upper side of the backrest. Such pinch protection device for example can evaluate a motor current of a drive motor of the drive by using algorithms known per se, in order to infer whether an obstacle is pinched between the headrest and an upper side of the backrest with reference to the course of the motor current. Of course, other sensorily operating, in particular capacitively operating pinch protection devices also would be conceivable, in order to detect a pinching case and, if necessary, stop and/or reverse an adjustment of the headrest and hence of the backrest.

In particular to facilitate the preassembly of parts of the vehicle seat, a backrest module for a backrest to be mounted pivotally relative to a seating surface of a vehicle seat is proposed on the basis of the present invention.

A backrest module according to the invention at least includes the following:
  a backrest frame,
  a backrest adjusting mechanism and a drive for pivoting the backrest, wherein the backrest adjusting mechanism and the drive are premounted on the backrest frame, and
  at least one headrest adjustably mounted on the backrest frame, which by means of a headrest adjusting mechanism likewise premounted on the backrest frame is shiftable at least along a direction of longitudinal extension of the backrest frame.

According to the invention it is provided that the drive is coupled both with the backrest adjusting mechanism and with the headrest adjusting mechanism, in order to simultaneously transmit an adjustment force to the headrest adjusting mechanism when the backrest is pivoted in at least one backrest adjustment direction and thereby adjust the headrest.

The backrest module premounted with the backrest adjusting mechanism and the headrest adjusting mechanism thus is formed as pre-testable construction unit and in the premounted condition can be connected with a seat part of the vehicle seat. The backrest frame here can include lateral fittings as part of the backrest adjusting mechanism, via which the backrest frame can pivotally be mounted on the seat part of the vehicle seat.

BRIEF DESCRIPTION OF THE DRAWING

Further advantages and features of the present invention will become apparent from the following description of exemplary embodiments with reference to the attached FIGURE.

FIG. 1 shows a perspective view of a premounted backrest module for the backrest of a vehicle seat with a backrest frame to be mounted pivotally on a seat part and with a headrest adjustably arranged thereon.

DETAILED DESCRIPTION

The attached FIG. 1 shows a backrest L for a vehicle seat, which via (rotary) fittings B1 and B2 is to be mounted pivotally on a non-illustrated seat part which provides a seating surface of the vehicle seat. The backrest L here is designed as backrest module and includes a backrest frame LR on which a backrest adjusting mechanism LV and a headrest adjusting mechanism KV for a headrest K as well as a drive A coupled with both adjusting mechanisms LV and KV are arranged.

Beside the fittings B1 and B2 the backrest adjusting mechanism LV includes a drive shaft W connecting the two fittings B1 and B2 with each other and extending transversely to a direction of longitudinal extension of the backrest L and of the backrest frame LR. The drive shaft W is connected to a first transmission output GA1 of a transmission G of the drive unit A, so that via a drive motor M of the drive A power-operated pivoting of the backrest about the pivot axis defined by the drive shaft W in backrest adjustment direction R1 can be controlled in a manner known per se.

The drive A with the drive motor M and the downstream transmission G in the present case is fixed in a space-saving manner on a side bar of the backrest frame LR in the region of one of the fittings B1, B2.

In the present case, the drive A is coupled with the backrest adjusting mechanism LV not only mechanically, but also mechanically with the headrest adjusting mechanism KV. For this purpose a flexible drive shaft F. e.g. in the form of a so-called "flex-shaft", is connected to a second transmission output GA2 of the transmission G. The flexible shaft F in turn is connected with a spindle drive of the headrest adjusting mechanism KV and during a rotation about its shaft axis drives a spindle 1 non-rotatably connected with the flexible shaft F. By rotating the spindle 1a spindle nut meshing with the external thread of the spindle 1, which is formed by a drive element 2, is translatorily shifted along the spindle 1 in an adjustment direction R2.

The spindle 1 extends centrally between two clip tubes 31 and 32 of an adjusting element formed as adjusting clip 3 of the headrest adjusting mechanism KV. The adjusting clip 3 is formed U-shaped and carries the headrest K on a base 33 connecting the two clip tubes 31 and 32 and protruding beyond the backrest frame LR on its upper side. The drive element 2 is connected with the clip tubes 31 and 32 via rotary joints 21 and 22 on both sides of the spindle 1 such that shifting of the drive element 2 along the spindle axis leads to a translatory adjustment of the adjusting clip 3. By shifting the adjusting clip 3 via the spindle drive with the spindle 1 and the drive element 2, a height adjustment of the headrest K thus is achieved.

The headrest K is held on the adjusting clip 3 via a headrest box 7 of the headrest K. The headrest box 7 is shiftably mounted on the adjusting clip 3, so that the headrest K in the present case also is manually shiftable relative to the adjusting clip 3 along adjustment directions R3 and in addition is manually adjustable in its height.

For specifying a defined guideway for the adjusting clip 3 on the backrest frame LR during an adjustment via the drive A, the adjusting clip 3 is guided in a connecting link guide with two opposed slotted guides 41 and 42. Each clip tube 31 and 32 here includes guiding elements in the form of guide pins 310 or 320 protruding to the outside, transversely to the direction of longitudinal extension of the backrest frame LR, which each are slidingly guided in a slotted guide 41 or 42. Opposite these guide pins 310 and 320 the drive element 2 each is articulated to the corresponding clip tube 31 or 32.

The articulation of the drive element 2 arranged between the clip tubes 31 and 32 in the present case avoids undesired loads of the spindle 1 and the spindle nut of the drive element 2 meshing with each other, as via the slotted guides 41 and 42 no guideway extending exclusively linearly and parallel to the spindle axis of the spindle 1 is specified for the adjusting clip 3. Each slotted guide 41 and 42 rather defines two guideway portions 4a and 4b, wherein a first guideway portion 4a adjoins a second guideway portion 4b in direction of the upper side of the backrest L. The second guideway portion 4b here extends substantially parallel to the spindle axis of the spindle 1, whereas the first guideway portion 4a extends obliquely to the second guideway portion 4b. The inclination of the part of the connecting link guide defining the first guideway portion 4a is chosen such that at its lower end connected with the drive element 2 the adjusting clip 3 not only is shifted to the top, but at the same time also to the rear, i.e. away from a back cushion arranged on the backrest L and hence away from a back of a seat user. Above the connecting link guide the adjusting clip 3 furthermore is guided on its clip tubes 31 and 32 in bearing sleeves 51, 52 which in rotary joints 61 and 62 are pivotally mounted on the backrest frame LR. Via this rotatable mounting on the backrest frame LR, the adjusting clip 3 can perform a swivel movement when the guide pins 310, 320 are guided along the obliquely extending guideway portion 4a. At the first guideway portion 4a the connecting link guide thus imposes a swivel movement on the adjusting clip 3 and hence on the headrest K fixed thereto an additional adjusting movement transversely to the longitudinal direction of the backrest L to the front. Via the obliquely extending guideway portion 4a a height adjustment of the headrest K thus is superimposed with a tilt adjustment of the headrest K. As a result, the headrest K is inclined forwards at this part of the connecting link guide the more, the more the backrest L is inclined to the rear.

The illustrated backrest L preferably is provided for a vehicle seat of a rear seat row of a vehicle in which the backrest L can be folded forwards onto the seating surface of the vehicle seat, in order to provide an additional loading space. Due to the mechanical coupling of the drive unit A both with the backrest adjusting mechanism LV and with the headrest adjusting mechanism KV it is achieved that the headrest K likewise is adjusted when the backrest L is pivoted controlled via the drive A. The headrest K is lowered maximally when the backrest L is folded forwards completely or maximally. It thereby is achieved that the backrest L with the retracted headrest K requires little space in a position folded forwards. When folding forwards, the risk additionally is minimized that an extended headrest K collides with an obstacle, e.g. a headrest or backrest of a front seat.

In one development, the transmission G includes a third transmission output via which the drive A is mechanically coupled with a further adjusting mechanism, by means of which the seating surface is lowered when the backrest is pivoted (forwards) onto the seating surface. For this purpose, the further adjusting mechanism preferably engages a seat pan of the vehicle seat. By simultaneously lowering the seating surface, the vehicle seat is folded together maximally in a position of the backrest L folded forwards and requires the smallest possible stowage space. In this way, the rear side of the backrest L easily can terminate with a loading area of the vehicle and provide a flat loading area in the rear part of the vehicle.

Although in the present case a direct mechanical coupling of the drive A both with the headrest adjusting mechanism KV and with the backrest adjusting mechanism LV is provided, so that the headrest K in any case is adjusted in its height when the backrest L is pivoted, the illustrated backrest L furthermore offers sufficient possibilities for an individual adjustment, in that the headrest box 7 is shiftably held on the adjusting clip 3 via a sliding fit. The adjustment of the headrest K relative to the adjusting clip 3 can be effected independent of the drive A and manually by a user. In addition, the headrest K can pivotally be mounted on the upper end of the adjusting clip 3, in order to also be able to individually adjust an inclination of the headrest K.

It should also be noted that instead of a guideway with an angled first guideway portion 4a a linearly extending guideway can of course also be specified via a connecting link guide. A kink in the guideway defined by the first obliquely extending guideway portion 4a likewise can be positioned different from the illustrated exemplary embodiment, in order to sooner or later provide a tilt adjustment of the headrest K when the headrest K is extended.

The clip tubes 31 and 32 need not be designed linear either. A bent design is of course also possible. Although for weight reduction an adjusting clip made of one tube or of several tubes is to be preferred in the present case, the adjusting clip 3 of course can also be designed not hollow.

As an alternative to a connection of the spindle 1 via the flexible shaft F to the drive A it can be provided for example that a spindle is connected directly to one of the transmission outputs GA1, GA2, in order to shift a drive element along the spindle axis. A connection to an adjusting clip 3 for retracting and extending the headrest K then for example might be effected via a transmission element. Such transmission element can be a coupling rod which at its end is articulated to the drive element of the spindle drive and to the adjusting clip 3.

Instead of a drive A with a drive motor M, a manually actuatable drive with a transmission G can of course also be provided. An adjustment force would be manually introduced by a user via an actuating element at the backrest L, for example a hand wheel, and be transmitted both to the backrest adjusting mechanism LV and to the headrest adjusting mechanism KV by means of the transmission G via the transmission outputs GA1 and GA2.

In contrast to the illustrated design variant it can furthermore be provided that a headrest adjusting mechanism KV only is driven by the drive A when the backrest L is folded forwards. For this purpose a Bowden cable can be provided, which is guided in an actuating tube 31 or 32 and is attached to the headrest K, e.g. to the headrest box 7. When pivoting the backrest L in direction of the seating surface, i.e. in particular when folding the backrest L forwards, a pulling force than can be introduced into the headrest K via the drive A in direction of the backrest L. For this purpose, the Bowden cable for example is wound up on a winding element rotated via the second transmission output GA2. When folding the backrest forwards, the headrest K initially is shifted relative to the adjusting clip 3 and lowered as a result of the pulling force acting on the headrest K. Subsequently, the adjusting clip 3 is shifted downwards along the connecting link guide within the backrest frame LR and the headrest K thus is lowered further into a maximally lowered position. Extending the headrest K after folding the backrest L back then would be possible for example manually by a seat user.

To avoid that during power-operated lowering of the headrest K via the drive A an obstacle, in particular body parts of a user, are pinched between an upper side of the backrest L and the headrest K, a pinch protection device can be provided, which detects an obstacle. For detecting an obstacle, the pinch protection device for example can evaluate the course of the motor current of the drive motor M or sensorily, e.g. capacitively, monitor the adjusting movement of the headrest K relative to the backrest L or relative to the backrest frame LR. When a pinching case is detected, the adjustment of the headrest K is stopped and/or reversed. Possibly, an acoustic and/or visually perceptible alarm signal then can be issued.

The invention claimed is:

1. A vehicle seat comprising:
   a backrest which is pivotally mounted relative to a seating surface of the vehicle seat;
   a backrest adjusting mechanism and a drive for pivoting the backrest; and
   a headrest on the backrest having a height relative to the backrest adjustable by a headrest adjusting mechanism in its height at least along a direction of longitudinal extension of the backrest,
   wherein beside the backrest adjusting mechanism the drive is coupled with the headrest adjusting mechanism, in order to simultaneously transmit an adjustment force to the headrest adjusting mechanism when the backrest is pivoted towards the seating surface and away from the seating surface, and
   wherein the drive includes a transmission device with several transmission outputs and the drive is coupled with the backrest adjusting mechanism at a first transmission output of the transmission device and with the headrest adjusting mechanism at a second transmission output of the transmission device so that the motor is configured to drive the backrest adjusting mechanism via the first transmission output and is configured to drive the headrest adjusting mechanism via the second transmission output.

2. The vehicle seat according to claim 1, wherein the backrest is pivotable onto the seating surface of the vehicle seat via the drive and the drive is coupled with the headrest adjusting mechanism such that the headrest is maximally lowered when the backrest is pivoted onto the seating surface.

3. The vehicle seat according to claim 1, wherein the headrest adjusting mechanism includes an adjusting element carrying the headrest, which is adjustably guided along a guide relative to a backrest frame of the backrest.

4. The vehicle seat according to claim 3, wherein the guide includes at least one slotted guide along which a guiding element of the adjusting element is slidingly guided.

5. The vehicle seat according to claim 3, wherein via the guide a linearly extending guideway is defined.

6. The vehicle seat according to claim 3, wherein the adjusting element is mounted on the backrest frame via at least one rotary joint.

7. The vehicle seat according to claim 3, wherein the headrest is adjustably mounted on the adjusting element.

8. The vehicle seat according to claim 3, wherein the headrest adjusting mechanism comprises a spindle drive with a translatorily adjustable drive element for adjusting the headrest and a flexible drive shaft and wherein the drive element is coupled with the adjusting element carrying the headrest.

9. The vehicle seat according to claim 3, wherein via the guide a guideway with a linearly extending portion and at least one further portion extending obliquely thereto is defined.

10. The vehicle seat according to claim 1, wherein the headrest adjusting mechanism comprises at least one of a spindle drive with a translatorily adjustable drive element for adjusting the headrest and a flexible drive shaft.

11. The vehicle seat according to claim 1, wherein the vehicle seat includes a further adjusting mechanism via which the seating surface is lowered when the backrest is pivoted onto the seating surface, and the drive likewise is coupled with the adjusting mechanism for lowering the seating surface.

12. The vehicle seat according to claim 1, wherein the vehicle seat is provided for a rear seat row of a vehicle and/or is formed as rear bench.

13. A backrest module for a backrest of a vehicle seat to be mounted pivotally relative to a seating surface of the vehicle seat, the backrest module comprising:
   a backrest frame,
   a backrest adjusting mechanism and a drive for pivoting the backrest, wherein the backrest adjusting mechanism and the drive are premounted on the backrest frame, and
   a headrest adjustably mounted on the backrest frame in at least along a direction of longitudinal extension of the backrest frame via a headrest adjusting mechanism likewise premounted on the backrest frame,
   wherein beside the backrest adjusting mechanism the drive is coupled with the headrest adjusting mechanism, in order to simultaneously transmit an adjustment force to the headrest adjusting mechanism when the backrest is pivoted towards the seating surface and away from the seating surface, and
   wherein the drive includes a transmission device with several transmission outputs and the drive is coupled with the backrest adjusting mechanism at a first transmission output of the transmission device and with the headrest adjusting mechanism at a second transmission output of the transmission device so that the motor is configured to drive the backrest adjusting mechanism via the transmission output and is configured to drive the headrest adjusting mechanism via the second transmission output.

* * * * *